US009478822B2

(12) United States Patent
Blanchet

(10) Patent No.: US 9,478,822 B2
(45) Date of Patent: Oct. 25, 2016

(54) MULTI-STACK ELECTROCHEMICAL CELL SYSTEM AND METHOD OF USE

(71) Applicant: Nuvera Fuel Cells, Inc., Billerica, MA (US)

(72) Inventor: Scott Blanchet, Chelmsford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 82 days.

(21) Appl. No.: 14/447,052

(22) Filed: Jul. 30, 2014

(65) Prior Publication Data

US 2015/0050571 A1    Feb. 19, 2015

Related U.S. Application Data

(60) Provisional application No. 61/866,149, filed on Aug. 15, 2013.

(51) Int. Cl.
| | |
|---|---|
| H01M 8/06 | (2016.01) |
| H01M 8/04 | (2016.01) |
| H01M 8/24 | (2016.01) |
| H01M 2/38 | (2006.01) |
| H01M 2/40 | (2006.01) |

(52) U.S. Cl.
CPC ......... *H01M 8/249* (2013.01); *H01M 8/04201* (2013.01); *H01M 8/04231* (2013.01); *H01M 8/2485* (2013.01); *H01M 8/04097* (2013.01); *H01M 8/04559* (2013.01); *H01M 8/04746* (2013.01); *H01M 8/04761* (2013.01); *Y02E 60/50* (2013.01)

(58) Field of Classification Search
CPC ..... H01M 8/04; H01M 8/04097; H01M 8/24
USPC ................. 429/415, 452, 454, 443
See application file for complete search history.

(56) References Cited

U.S. PATENT DOCUMENTS

| | | | |
|---|---|---|---|
| 6,168,705 B1* | 1/2001 | Molter | B01D 53/228 |
| | | | 205/637 |
| 2005/0164069 A1* | 7/2005 | Margiott | H01M 8/04089 |
| | | | 429/432 |
| 2006/0088743 A1 | 4/2006 | Gallagher et al. | |

FOREIGN PATENT DOCUMENTS

WO    WO-2008-099575 A1    8/2008

OTHER PUBLICATIONS

International Search Report and Written Opinion for International Application No. PCT/US2014/049122, dated Oct. 13, 2014, (9 pages).

* cited by examiner

*Primary Examiner* — Patrick Ryan
*Assistant Examiner* — Julian Anthony
(74) *Attorney, Agent, or Firm* — Finnegan, Henderson, Farabow, Garrett & Dunner LLP.

(57) ABSTRACT

An electrochemical cell stack system may include a plurality of cell stacks fluidly connected by a plurality of first conduits to form a loop of cell stacks. At least one first valve may be located on each first conduit and may be capable of a closed configuration and an open configuration. Each of the cell stacks may have an input end for receiving a first fluid and an output end for discharging a second fluid. The system may deliver the first fluid from the fluid source to the input end of a first cell stack of the plurality of cell stacks via a first input line of a plurality of input lines and may receive the second fluid from the output end of a second cell stack of the plurality of cell stacks via a first output line of a plurality of output lines.

21 Claims, 2 Drawing Sheets

MULTI-STACK ELECTROCHEMICAL CELL SYSTEM AND METHOD OF USE

This patent application claims the benefit of priority under 35 U.S.C. §120 to U.S. Provisional Application No. 61/866,149, filed on Aug. 15, 2013, the entirety of which is incorporated herein by reference.

Embodiments of the present disclosure relate to electrochemical cells, and more particularly, to electrochemical cell stack systems for promoting efficient fuel cell operation.

Electrochemical cell technology, like fuel cells and hydrogen compressors, offers a promising alternative to traditional power sources, such as fossil fuels, for a range of technologies, including, for example, transportation vehicles, portable power supplies, and stationary power production. Successful commercialization of hydrogen as an energy carrier and the long-term sustainability of a "hydrogen economy" may depend at least in part on the efficiency, output capabilities, and cost-effectiveness of electrochemical cells and hydrogen manipulation and management systems (e.g., EHCs).

Electrochemical cells are devices typically used for generating current from chemical reactions or by inducing a chemical reaction using a flow of current. An electrochemical cell converts the chemical energy of a fuel (a proton source like hydrogen, natural gas, methanol, gasoline, etc.) into electricity through a chemical reaction with oxygen or another oxidizing agent. The chemical reaction typically yields electricity, heat, and water. To accomplish this, a basic electrochemical cell comprises a negatively charged anode, a positively charged cathode, and an ion-conducting material called an electrolyte. Different electrochemical cell technologies utilize different electrolyte materials. A Proton Exchange Membrane (PEM) cell, for example, utilizes a polymeric, ion-conducting membrane as the electrolyte.

To generate electricity, a fuel, such as hydrogen, for example, may be delivered to an anode side of an electrochemical cell. Here, hydrogen may be split into positively charged protons and negatively charged electrons. The electrochemical reaction at the anode is $2H_2 \rightarrow 4H^+ + 4e^-$. The protons may then flow through an electrolyte membrane, such as a PEM, to a cathode side of the cell. The PEM may be configured to allow only positively charged protons to pass through to the cathode side of the cell. The negatively charged electrons may be forced to pass through an external electric load circuit to reach the cathode side of the cell, and in doing so, may generate a usable electrical current. Oxygen may be delivered to the cathode side of the cell, where it may react with the protons and the electrons to form water molecules and heat as waste. The exothermic reaction at the cathode side is $O_2 + 4H^+ + 4e^- \rightarrow 2H_2O$.

The cathode, electrolyte membrane, and anode of an individual electrochemical cell, may collectively form a "membrane electrode assembly" (MEA), which may be supported on both sides by bipolar plates. Gases, such as hydrogen and oxygen, may be supplied to the electrodes of the MEA through channels or grooves formed in the bipolar plates.

In operation, a single cell may generally produce a relatively small electrical potential, about 0.2-1 volt, depending on the current. To increase the total voltage output, individual electrochemical cells may be stacked together, typically in series, to form an electrochemical cell stack. The number of individual cells included in a stack may depend on the application and the amount of output required from the stack for that application. Additionally, a number of stacks may be arranged in a series in order to increase the output generated.

Electrochemical cell stacks may receive flows of hydrogen and oxygen, which may be distributed to the individual cells and/or passed from cell stack to cell stack. Proper operation of the cell stack may require effective delivery of reactants, e.g., hydrogen and oxygen, to the cell stacks and individual cells and components. For example, in order to minimize wasted hydrogen gas, a system of cell stacks may be arranged to operate in a linear, 'dead-ended' mode. In a dead-ended mode, contrasted to a "flow-through" mode, substantially all of the hydrogen introduced into the system must be consumed by the cells and/or stacks, because there is no other place for the hydrogen to go. For practical reasons, a small purge may be included in a dead-ended mode to get rid of built-up pollutants, but this may in many instances be kept to less than approximately 0.5%. However, hydrogen gas delivered to the anode or low-pressure side may include trace non-hydrogen contaminants, such as CO, $CO_2$, $N_2$, He, Ar, $O_2$, $CH_4$, higher hydrocarbons, S, Cl, Br, Hg, VOCs, $H_2O$, HCHO, HCOOH, $NH_3$, halogenated compounds, and particulates, for example. If these contaminants accumulate in an electrochemical cell stack or across a cell stack system, they may reduce hydrogen partial pressure and cause increased voltage and decreased compression. Decreased compression efficiency may eventually overwhelm a stack, leading to failure. Thus, contaminants may need to be periodically removed from the cell stack to promote efficiency and proper operation.

Additionally, in order to maintain proper hydration of the electrolyte membranes, for example in a low-temperature PEM EHC, water vapor may need to be provided to the electrochemical stack, typically at the low-pressure inlet. Water molecules may also act as a diluent or contaminant. Over time, this water may condense within the flow field of the stack and may also degrade performance by flooding. Thus, water and/or water vapor may need to be removed from the system to promote efficiency and proper operation.

Further, the efficiency and amount of voltage produced by an electrochemical cell may depend, at least in part, on the stoichiometric flow rate. Gas stoichiometry is the ratio of gas supplied to the electrochemical cell that is necessary to react with the hydrogen fuel. A lower value of gas stoichiometry may reduce performance of the electrochemical cell due to a lack of reactants at the reaction sites. A higher value of stoichiometry and gas velocity may be used to purge excess water from an electrochemical cell stack system. For example, in the low-pressure flow field, a velocity of gas equal to or greater than approximately two times the inlet flow rate (i.e., a stoichiometry of two) may be used to purge water in a cell stack system in dead-ended mode. Such a velocity may be provided by an active recirculation pump, a passive ejector, or a periodic pulse purge of the dead-ended system, for example. On the other hand, a higher value of stoichiometry may cause poor humidity control by drying out the membranes and excess compression energy. In this way, the gas flow rate may also affect the amount of water in the electrochemical cell system. Accordingly, it may be desirable to control and manage the flow of gas and the purging of build-up in an electrochemical cell system. Embodiments of the present disclosure may set out to solve one or more of the above problems.

The present disclosure is directed toward the design and arrangement of electrochemical cell stack systems. In particular, the present disclosure is directed to a cycling, multi-stack system to promote efficient gas flow across the stacks and to discourage accumulation of contaminants.

Such systems and configurations may be used in electrochemical cells operating under high differential pressures, including, but not limited to, hydrogen pumps, hydrogen compressors, fuel cells, electrolysis cells, hydrogen purifiers, and hydrogen expanders.

In accordance with one embodiment, an electrochemical cell stack system may include a plurality of electrochemical cell stacks fluidly connected to each other by a plurality of first conduits that each connects at least two cell stacks to form a loop of cell stacks, wherein each of the plurality of cell stacks has an input end for receiving a first fluid and an output end for discharging a second fluid. The system may further include a plurality of first valves, with at least one first valve located on each first conduit, and the first valves may be capable of a closed configuration to substantially prevent fluid flow and an open configuration to allow fluid flow. A fluid source may be fluidly connected to the input end of each of the plurality of cell stacks by a plurality of input lines, wherein the fluid source is configured to contain the first fluid, and a purge mechanism may be fluidly connected to the output end of each of the plurality of cell stacks by a plurality of output lines, wherein the purge mechanism is configured to receive the second fluid. The cell stack system may be configured to deliver the first fluid from the fluid source to the input end of a first cell stack of the plurality of cell stacks via a first input line of the plurality of input lines and may receive the second fluid from the output end of a second cell stack of the plurality of cell stacks via a first output line of the plurality of output lines.

Various embodiments of the disclosure may include one or more of the following aspects: the system may be configured so that any of the plurality of cells stacks can be the first cell stack and any of the plurality of cells stacks can be the second cell stack; only one of the plurality of first valves may be configured to be in the closed configuration at a time; the first valve in the closed configuration may be located between the first cell stack and the second cell stack; the system may include an inlet valve located between the fluid source and the plurality of input lines and configured to direct the first fluid from the first fluid source, through the first input line, to the first cell stack; the system may include an outlet valve located between the plurality of output lines and the purge mechanism and configured to direct the second fluid from the second cell stack, through the first output line, and to the purge mechanism; the system may be configured to periodically change which of the plurality of cell stacks is the first cell stack and which of the plurality of cell stacks is the second cell stack; the system may include a controller that controls which of the plurality of cells stacks is the first cell stack and which of the plurality of cell stacks is the second cell stack and controls when the first cell stack is changed and when the second cell stack is changed; at least one measuring device may be configured to measure at least one parameter of the system; the controller may change the first and the second cell stacks based on the at least one measured parameter; the first fluid may be different than the second fluid; and the first fluid may contain a lower concentration of non-hydrogen gas than the second fluid.

In some embodiments of the present disclosure, an electrochemical cell stack system may include a plurality of cell stacks fluidly connected to each other to form a loop, wherein fluid flows between the plurality of cell stacks in the loop, and wherein the system may be configured to substantially prevent the flow of fluid between any two of the cell stacks, and wherein the system may be configured to switch which two cell stacks of the plurality of cell stacks that the flow of fluid is prevented from flowing between.

Various embodiments of the disclosure may include one or more of the following aspects: the cell stacks between which fluid is substantially prevented from flowing at a given time may include a first cell stack and a second cell stack, wherein the first cell stack is configured to receive a first fluid from a fluid source and is configured to discharge the first fluid consecutively to the next of the plurality of cell stacks in the loop, and wherein the second cell stack is the last cell stack in the loop to receive the first fluid, and wherein the second cell stack is configured to discharge a second fluid to a purge valve; the second fluid may include a higher concentration of contaminants than the first fluid; each of the plurality of cell stacks may be fluidly connected in the loop by a plurality of conduits, and each of the plurality of conduits may include a valve configured to switch between a first configuration in which fluid flow between connected fuel cell stacks is substantially prevented and a second configuration in which fluid flow between connected fuel cell stacks is permitted; an inlet valve may fluidly connect the fluid source to a plurality of inlet lines, wherein the inlet valve may be fluidly connected to each of the plurality of cell stacks via one of the plurality of inlet lines, and may be configured to receive the first fluid from the fluid source and deliver the first fluid to the first cell stack via one of the plurality of inlet lines at a time; an outlet valve may fluidly connect the purge valve to a plurality of outlet lines, wherein the outlet valve may be fluidly connected to each of the plurality of cell stacks via one of the plurality of outlet lines, and may be configured to receive the second fluid from the second cell stack via one of the plurality of outlet lines at a time to deliver the second fluid to the purge valve; a controller may be operatively connected to the inlet valve and the outlet valve and may be configured to switch which cell stacks of the plurality of cell stacks that the flow of fluid is prevented from flowing between; at least one measuring device may be configured to measure at least one parameter of the system, wherein the controller switches which cell stack of the plurality of cell stacks that the flow of fluid is prevented from flowing between based on the at least one measured parameter; and each of the plurality of cells stacks may be fluidly connected to at least three other cell stacks.

Additional objects and advantages of the embodiments will be set forth in part in the description that follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention, and together with the description, serve to explain the principles of the invention.

Reference will now be made in detail to the exemplary embodiments of the present disclosure described below and illustrated in the accompanying drawings. Wherever possible, the same reference numbers will be used throughout the drawings to refer to same or like parts.

While the present disclosure is described herein with reference to illustrative embodiments of an electrochemical hydrogen compression system, it is understood that the devices and methods of the present disclosure may be employed with various types of electrochemical cells, including, but not limited to, any suitable hydrogen pumps, fuel cells, electrolysis cells, hydrogen purifiers, and hydrogen expanders. Those having ordinary skill in the art and access to the teachings provided herein will recognize additional modifications, applications, embodiments, and substitution of equivalents that all fall within the scope of the disclosure. Accordingly, the disclosure is not to be considered as limited by the foregoing or following descriptions.

Other features and advantages and potential uses of the present disclosure will become apparent to someone skilled in the art from the following description of the disclosure, which refers to the accompanying drawings.

Figure 1:
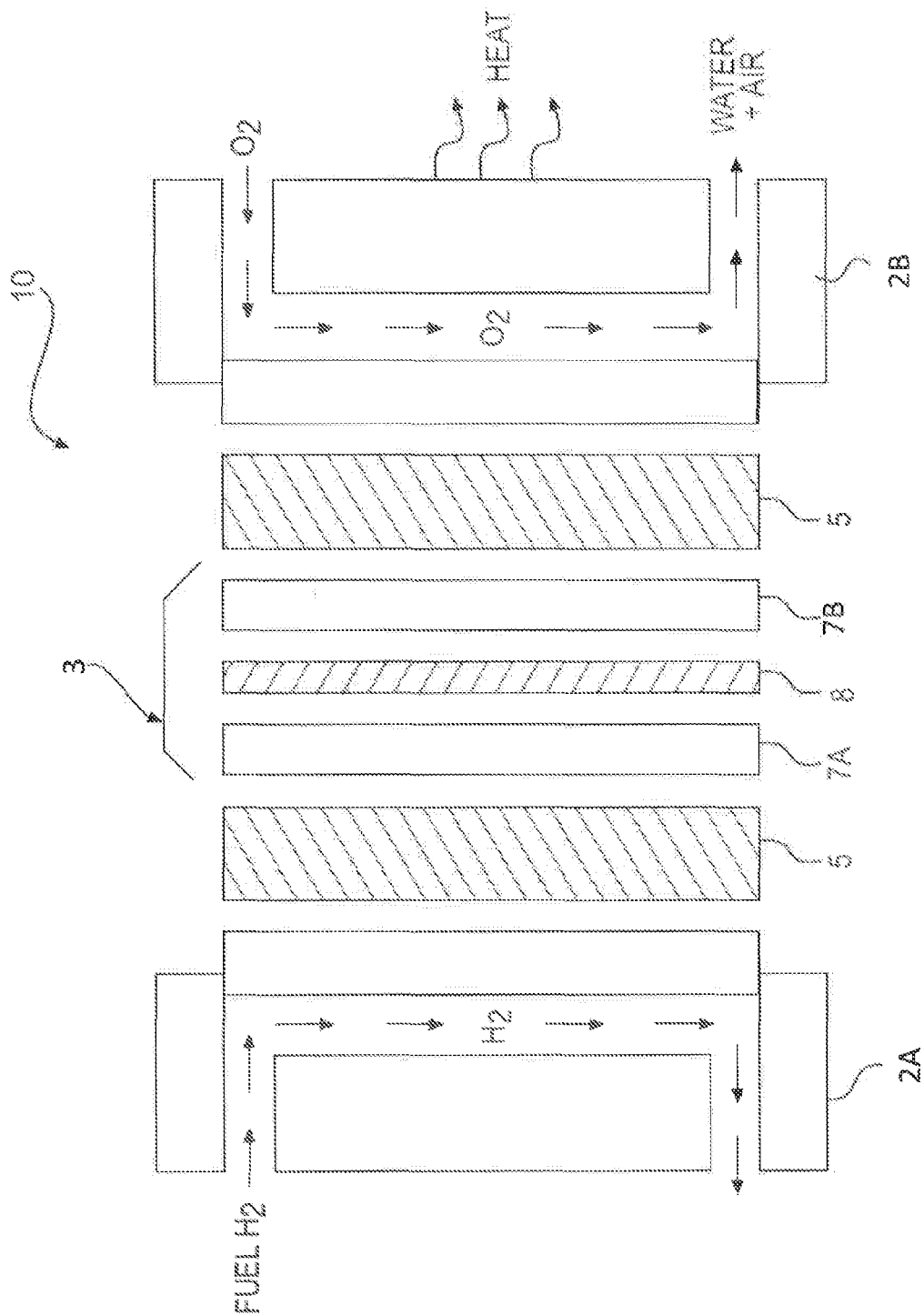
FIG. 1 illustrates an exploded view of an exemplary electrochemical cell, according to an embodiment of the present disclosure.

FIG. 1 depicts an individual electrochemical cell 10, according to an embodiment of the present disclosure. In the exploded side view shown in FIG. 1, cell 10 includes a central, electrolyte membrane 8. Electrolyte membrane 8 may be positioned between an anode 7A and a cathode 7B. Together, electrolyte membrane 8, anode 7A, and cathode 7B may form MEA 3. Hydrogen atoms supplied to anode 7A may be electrochemically split into electrons and protons. The electrons may flow through an electric circuit (not shown) to cathode 7B, generating electricity in the process, while the protons may pass through electrolyte membrane 8 to cathode 7B. At cathode 7B, protons may react with electrons and oxygen supplied to cathode 7B to produce water and heat.

Electrolyte membrane 8 may electrically insulate anode 7A from cathode 7B. Electrolyte membrane 8 may be any suitable membrane, including, e.g., a PEM membrane. Electrolyte membrane 8 may be formed of a pure polymer membrane or a composite membrane, which may include, e.g., silica, heteropolyacids, layered metal phosphates, phosphates, and zirconium phosphates, embedded in a polymer matrix. Electrolyte membrane 8 may be permeable to protons but may not conduct electrons. Anode 7A and cathode 7B may include porous carbon electrodes containing a catalyst. The catalyst material, e.g., platinum or any other suitable material, may speed up the reaction of oxygen and fuel.

In some embodiments, electrochemical cell 10 may optionally include one or more electrically conductive flow structures 5 on each side of MEA 3. Flow structures 5 may serve as diffusion media enabling the transport of gases and liquids within cell 10. Flow structures 5 may also promote electrical conduction, aid in the removal of heat and water from electrochemical cell 10, and provide mechanical support to electrolyte membrane 8. Flow structures 5 may include, e.g., flow fields, gas diffusion layers (GDL), or any suitable combination thereof. Flow structures 5 may be formed of "frit"-type sintered metals, layered structures, e.g., screen packs and expanded metals, and three-dimensional porous substrates. An exemplary porous metallic substrate may consist of two distinct layers having different average pore sizes. Such flow structures 5 may be formed of any suitable material, including, e.g., metals or metal alloys, such as, e.g., stainless steel, titanium, aluminum, nickel, iron, nickel-chrome alloys, and nickel-tin alloys, or any combination or alloys thereof. In addition, flow structures 5 may include a suitable coating, such as a corrosion-resistant coating, like carbon, gold, or titanium-nitride.

Flanking flow structures 5 and MEA 3, cell 10 may also include two bipolar plates 2A, 2B. Bipolar plates 2A, 2B may separate cell 10 from neighboring electrochemical cells (not shown) in a stack. In some embodiments, two adjacent cells in an electrochemical cell stack may share a common bipolar plate.

Bipolar plates 2A, 2B may act as current collectors, may provide access channels for the fuel and the oxidant to reach the respective electrode surfaces, and may provide channels for the removal of water formed during operation of electrochemical cell 10 by means of exhaust gas. Bipolar plates 2A, 2B may also provide access channels for cooling fluid, such as, e.g., water, glycol, or a combination thereof. Bipolar plates 2A, 2B may be made from aluminum, steel, stainless steel, titanium, copper, nickel-chrome alloy, graphite, or any other suitable electrically conductive material or combination of materials.

Individual fuel cells 10 may be stacked in series to form an electrochemical cell stack to increase voltage output. An electrochemical cell stack may be comprised of any suitable number of cells 10. Further, multiple stacks may be operably connected in a cell stack system in order to increase output, as discussed above. Traditional stacks may be arranged in a linear, dead-ended mode. In such a mode, hydrogen gas may be fed into a first cell stack in the series and passed through consecutive stacks to the final, dead-ended stack. Contaminants may build up over time, especially in the last, dead-ended stack, which may need to be purged periodically as a result.

The present disclosure proposes an alternate method for managing flows through and purges of a cell stack system containing two or more fuel cell stacks.

Figure 2:
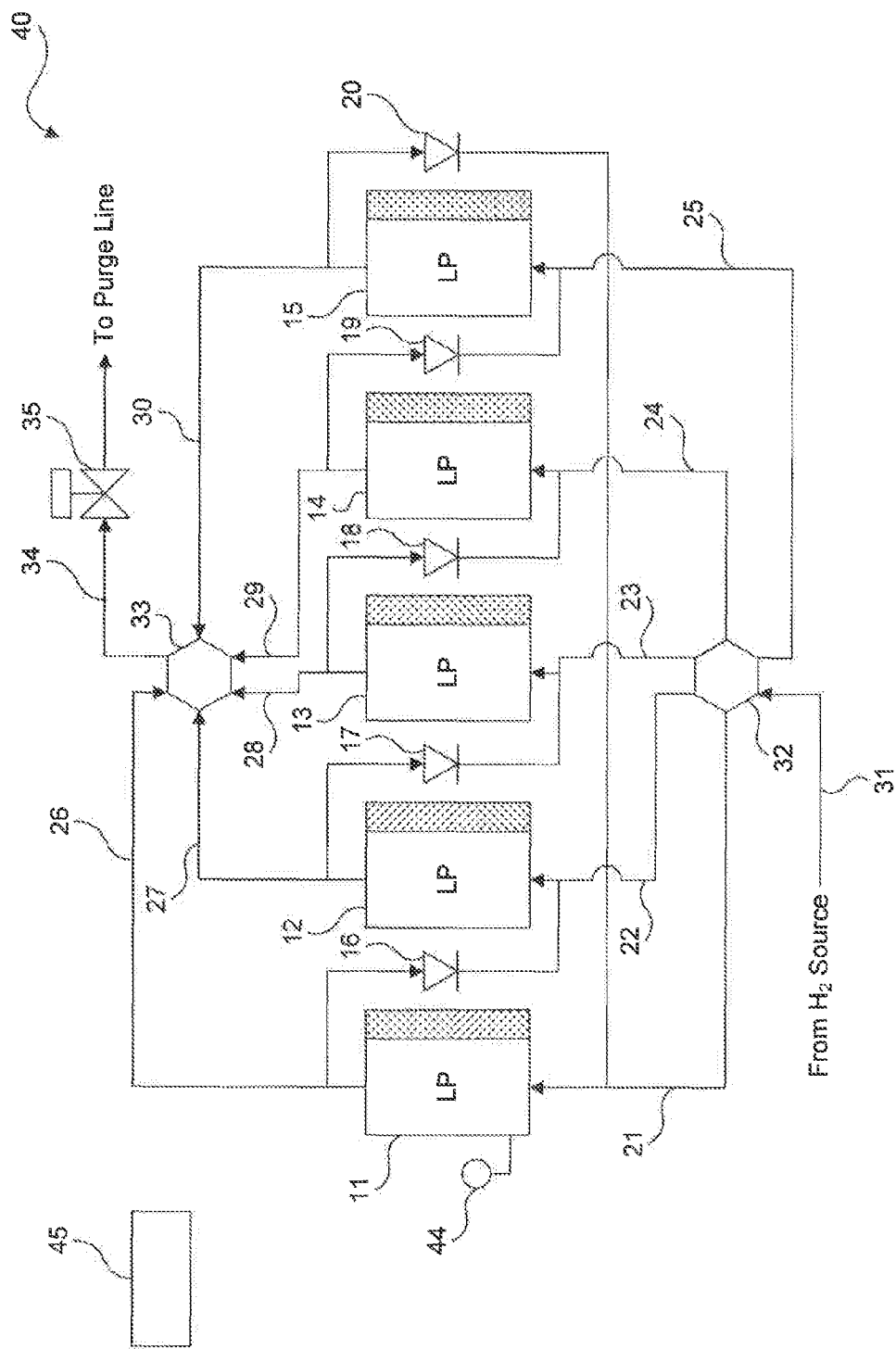
FIG. 2 illustrates a schematic view of an exemplary electrochemical cell stack system, according to an embodiment of the present disclosure.

FIG. 2 illustrates an exemplary embodiment of a multistack system 40. System 40 may include any number of cell stacks greater than one, and in the embodiment of FIG. 2, system 40 includes five cell stacks 11, 12, 13, 14 and 15. Stacks 11, 12, 13, 14 and 15 may be fluidly connected in series to the subsequent cell stack on the low pressure side with a valve located between each stack connection. For example, fluid check valve 16 is located between stacks 11 and 12, fluid check valve 17 is located between stacks 12 and 13, fluid check valve 18 is located between stacks 13 and 14, fluid check valve 19 is located between stacks 14 and 15, and fluid check valve 20 is located between stacks 15 and 11. With stacks 11, 12, 13, 14 and 15 connected in this manner, hydrogen gas may be provided to stack 11, which may feed stack 12, which in turn feeds stack 13, which in turn feeds stack 14, which in turn feeds stack 15. Finally, stack 15 feeds stack 11, completing the low-pressure loop.

System 40 may also include an inlet selector valve 32 fluidly connected to the low pressure inlet side of each cell stack. An inlet line 21 connects valve 32 to stack 11, an inlet line 22 connects valve 32 to stack 12, an inlet line 23 connects valve 32 to stack 13, an inlet line 24 connects valve 32 to stack 14, and an inlet line 25 connects valve 32 to stack 15. Valve 32 is also connected by inlet line 31 to a source of hydrogen, which may be configured to provide hydrogen gas or other suitable reactants to valve 32 and system 40. Valve 32 may be a multi-way valve or may consist of a number of discrete valves, and the number of possible configurations for valve 32 may correspond to the number of cell stacks provided in system 40, or may be greater. For example, in the system of FIG. 2 containing five cell stacks, valve 32 may be a five-way selector valve, and thus may be capable of five separate configurations. In some embodiments, valve 32 may be a six-way valve to provide control over the inflow of hydrogen to valve 32, or may be capable of additional configurations to provide the ability to select between multiple hydrogen sources or to provide redundancy in system 40, for example.

System 40 further includes an outlet valve 33 fluidly connected to the outlet side of each cell stack. An outlet line 26 connects valve 33 to stack 11, an outlet line 27 connects valve 33 to stack 12, an outlet line 28 connects valve 33 to stack 13, an outlet line 29 connects valve 33 to stack 14, and an outlet line 30 connects valve 33 to stack 15. Valve 33 is also connected to purge line 34, which may be configured to allow contaminants or output from system 40 to be purged. Purge line 34 may further include one or more valves 35 configured to substantially prevent or allow fluid to flow through purge line 34 and out of system 40. Valve 33 may be a multi-way valve or may consist of a number of discrete valves, and the number of possible configurations for each valve may correspond to the number of cell stacks provided in system 40, or may be greater. For example, in the system of FIG. 2 containing five cell stacks, valve 33 may be a five-way selector valve, and thus may be capable of five separate configurations. In some embodiments, valve 33 may be a six-way valve to provide control over the purging of fluid out of valve 33, or may be capable of additional configurations to provide the ability to select between multiple purging locations or to provide redundancy in system 40.

Fluid check valves 16, 17, 18, 19, 20, 32, 33, and 35 may be any suitable valve. They may be one-way or multi-way valves. For example, instead of multi-way selector valves, valves 32 and 33 may instead include a series of discrete, one-way valves at the inlet or outlet to accomplish the selector function and achieve various configurations. In some embodiments, the selector function may be realized through individual, multi-port valves whose indexing position is substantially synchronized. The valves may include any suitable valves or combination of valves known in the art, including, e.g., ball valves, check valves, and/or butterfly valves, safety pressure release valves, self-actuating valves, shutoff valves, excess flow valves, etc. Further, any portion of system 40 (e.g., lines or sources) may include any suitable number of valves. Additionally, for the purpose of this disclosure, fluid may refer to either a liquid, a gas, or a mixture of liquid and gas.

If inlet selector valve 32 is configured to provide hydrogen through line 21 to stack 11 and outlet selector valve 33 is configured to receive output from stack 15, hydrogen is supplied to stack 11 and the resulting pressure differential across the stack chain may result in check valve 20 being closed, thereby preventing backflow from stack 15 to stack 11. This may cause hydrogen to flow from stack 11 to stack 12, to stack 13, to stack 14, and to stack 15. The closing of valve 20 may prevent hydrogen from flowing to cell 11. With purge valve 35 closed and with the process stopping at stack 15, system 40 may operate in this configuration as a net dead-ended system, with stack 15 at the end of the stack chain.

In this configuration, stack 11 may experience a higher stoichiometry of gas, and the stoichiometry may decrease along the stack chain. For example, in some embodiments, stack 11 may experience a stoichiometry of approximately five, stack 12 may experience a stoichiometry of approximately four, stack 13 may experience a stoichiometry of approximately three, stack 14 may experience a stoichiometry of approximately two, and stack 15 may experience a stoichiometry of approximately one. Under such conditions, only the last stack in the chain, in this case, stack 15, may experience substantial build-up of contaminants, including water vapor, while the other stacks in the chain may remain substantially well purged due to the comparatively higher stoichiometry.

System 40 may be capable of multiple configurations and thus capable of inputting hydrogen into any stack in the system and outputting build-up from any stack in the system, such that the chain of stacks may begin and end at any stack. For example, if inlet selector valve 32 is configured to provide hydrogen through line 22 to stack 12 and outlet selector valve 33 is configured to receive output from stack 11, hydrogen is supplied to stack 12 and then flows through stacks 13, 14, 15 and finally to stack 11. Valve 16 may be closed, preventing hydrogen from flowing from stack 11 to stack 12, and with purge valve 35 closed and with the process stopping at stack 11, system 40 may operate as a net dead-ended system, with stack 11 at the end of the chain and stack 12 at the head of the chain. In this way, system 40 may be configured to operate with any stack as the head of the stack chain and with any stack as the end of the chain.

In some embodiments, the stacks at the head of the chain and at the end of the chain may rotate. For example, once the build-up of contaminants in the stack at the end of the chain exceeds a certain, predetermined level, the end stack may be purged and inlet valve 32 and outlet valve 33 may be configured such that a new stack is selected as the end of the chain.

In some embodiments, system 40 may include one or more devices 44 to monitor the stacks, lines, and/or valves, and/or to measure a parameter of one or more of the stacks, lines, and/or valves. For example, the voltage output by a stack may be correlated, at least in part, to the amount of contaminants in the stack. For example, as the build-up of contaminants in a stack increases, the voltage may also increase. In some embodiments, the voltage of the end stack may be measured continuously or periodically, and when the voltage exceeds a predetermined threshold, contamination purge valve 35 may be opened to purge the end stack, and inlet valve 32 and outlet valve 33 may be configured to shift the head stack and the end stack in system 40 so that a new stack is now the end stack.

In some embodiments, other parameters of system 40 may be measured to determine when to switch the configuration of the stacks. For example, the pressure, temperature, current, flow rate, humidity, or other condition of system 40 may be measured, or multiple parameters may be measured. In some embodiments, the configuration of stacks may be switched after a predetermined period of time. Further, measurements may be taken periodically or continuously either manually or automatically. For example, a user may manually initiate a reading and determine whether that reading warrants switching of system 40. In some embodiments, measurements may be taken automatically, and system 40 may be switched automatically depending on the measurement's relationship to a predetermined threshold, for example. In some automatic embodiments, system 40 may include a manual override mechanism that allows a user to optionally control or stop automatic control of system 40. In some embodiments, system 40 may include a controller 45, such as a computer, to control monitoring and switching of system 40. Controller 45 may include, e.g., a Programmable Logic Controller (PLC), a Programmable Logic Relay (PLR), a Remote Terminal Unit (RTU), a Distributed Control System (DCS), a printed circuit board (PCB), or any other type of processor capable of controlling system 40, and controller 45 may be wirelessly or directly connected to system 40. In some embodiments, system 40 may further include one or more displays to output one or more parameters, measurements, or conditions of system 40. The display may include any suitable device (e.g., CRT monitors, LCD screens, etc.) capable of visually depicting information. In some embodiments, system 40 may include a manual override or an automatic shutoff configured to stop operation of system 40 if one or more parameters falls outside of a predetermined acceptable operating range.

In one exemplary embodiment, system 40 may initially be configured to operate with stack 11 at the head of the stack chain and stack 15 at the end of the stack chain. The voltage of stack 15 may be measured and monitored as an indicator of stack 15 contamination. Voltage may be measured either in absolute voltage direct current or relative to one or more of the other stacks in system 40. Voltage may be monitored in terms of a specific cell stack, an individual cell of a cell stack, an average of some or all of the cell stacks, an average of some or all of the individual cells of a cell stack, or a maximum voltage of the cells of a cell stack, or any suitable combination thereof. When the voltage (absolute, average, or otherwise) meets or exceeds a predetermined level or predetermined relative level, contamination purge valve 35 may be opened, either manually or automatically, to purge stack 15. After purging, inlet valve 32 and outlet valve 33 may be configured to make stack 12 the first stack in the chain and stack 11 the end stack in the chain by configuring inlet valve 32 to provide hydrogen through line 22 and configuring outlet valve 33 to receive output from line 26. The entire process may be repeated with the voltage of new end stack 11 now being measured and monitored. The table below demonstrates the lines that inlet valve 32 and outlet valve 33 would be configured to communicate with, and the check valves that would be opened and closed as each stack in this embodiment rotated through as head of the chain and end of the chain, according to an exemplary embodiment.

| Inlet Valve 32 Open to Line: | Outlet Valve 33 Open to Line: | Check Valve Closed | Head Stack | End Stack |
|---|---|---|---|---|
| 21 | 30 | 20 | 11 | 15 |
| 22 | 26 | 16 | 12 | 11 |
| 23 | 27 | 17 | 13 | 12 |
| 24 | 28 | 18 | 14 | 13 |
| 25 | 29 | 19 | 15 | 14 |

System 40 may rotate the first and last stacks in the chain sequentially (e.g., stack 11 is first in the chain, followed by stack 12, stack 13, stack 14, stack 15), or system 40 may rotate the stacks backwards sequentially (e.g., stack 15 is the first in the chain, followed by stack 14, stack 13, stack 12, and stack 11), or system 40 may switch the first and last stacks in the chain randomly, out of order, or in accordance with some other condition (e.g., stack 14 may be first, followed by stack 11, stack 13, stack 12, and stack 15). For example, in one embodiment, the head stack and the end stack may be chosen based on a measured parameter reading instead of its relative physical location to the other stacks. One of skill in the art will appreciate that because of the looping nature of system 40, no matter what rotation schedule is used for stacks 11, 12, 13, 14 and 15, any stack may initially be used as the head stack and any stack may initially be used as the end stack in the chain.

System 40 may be configured to rotate the stacks through one time, i.e., each stack in the system is the first stack once and each stack in the system operates as the last stack in the chain once. In such an embodiment, each stack in system 40 may experience approximately one stoichiometry of gas flow for only 20% of its operating life. This percentage would change depending on the number of stacks included in system 40. In some embodiments, system 40 may rotate the stacks through more than one time. For example, in some embodiments, system 40 may rotate the stacks through until a parameter of the head stack or end stack rotated to meets, exceeds, or drops below a predetermined level. In some embodiments, if system 40 senses that the new head stack or new end stack rotated to meets, exceeds, or drops below a predetermined level, system 40 may be configured to automatically switch to bypass that stack as the head or end stack and make the next stack the head stack or the end stack.

In some embodiments, stacks 11, 12, 13, 14 and 15 may not only be fluidly connected in series to neighboring stacks, but may also be connected to each of the other stacks with valves located between each stack connection. In this way, system 40 may be configured to rotate through the stacks in that system in any given order, and in some embodiments, the order chosen may depend, at least in part, on one or more parameters of one or more stacks. In other embodiments, in addition to or instead of purging the last stack in the chain once a parameter of the last stack meets, exceeds, or drops below a predetermined threshold, system 40 may be configured to close the valves connecting that stack to the others to bypass that stack, effectively cutting it out of the stack chain. In such an embodiment, the stack chain may decrease in the number of stacks as the head and end stacks are rotated. For example, in some embodiments, a stack may be cut out and isolated from the chain if a parameter of that stack is sensed as being outside of a normal operating range, for example, if the voltage still exceeds a certain threshold even after venting.

System 40 may include any suitable connectors or conduits, for example, inlets, outlets, or supply lines, and any suitable valves, or nozzles, or devices for controlling the flow of fluid. Further, one or more humidifiers or compressors, or any suitable device, may be included in system 40 to further promote gas management and system efficiency. In addition, system 40 may include any suitable measuring device 44 to measure any suitable parameter, for example, pressure, humidity, flow speed, temperature, voltage, current, or the amount of fluid input or output from system 40, whether or not the measurements taken using device 44 is used to control the configurations of system 40. Further, while device 44 is shown in FIG. 2 as operably coupled to cell stack 11, one or more devices 44 may be operably coupled to any portion or component of system 40. For example, a device 44 may be operably coupled to each cell stack, to any input or output lines, valves, sources, purge vents, etc.

Embodiments of the present disclosure may effectively purge contamination from system 40 without the need for a recirculation device, for example, an active pump or passive ejector. This may be achieved in one or more ways. First, switching may increase the average effective stoichiometry experienced by a stack over a greater portion of the stack's life, which may promote effective humidification of the stack and discourage exposure to, and build-up of, contamination. Second, during each purge event for the end stack in the chain, the average stoichiometry may increase as purge valve 35 is opened, which may promote effective purging of gaseous contaminants and liquid water from the end stack. For example, in the exemplary five-stack series discussed above, opening purge valve 35 may increase the stoichiometry in the end stack from approximately one to approximately five.

Additionally, the last stack in the chain may be the only stack substantially impacted by contaminant accumulation.

Therefore, the other stacks may provide a reference for expected performance, for example, to allow the system to learn and adjust as the stacks age or as operating conditions (e.g., ambient temperature, humidity, or pressure) change.

The many features and advantages of the present disclosure are apparent from the detailed specification, and thus, it is intended by the appended claims to cover all such features and advantages of the present disclosure that fall within the true spirit and scope of the present disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the claims are not to be considered as limited by the foregoing description.

What is claimed is:

1. An electrochemical cell stack system comprising:
a plurality of electrochemical cell stacks fluidly connected to each other by a plurality of first conduits, wherein each first conduit connects at least two cell stacks to form a loop of cell stacks, wherein each of the plurality of cell stacks has an input end for receiving a first fluid and an output end for discharging a second fluid;
a plurality of first valves, wherein at least one first valve is located on each first conduit and the first valves are capable of a closed configuration to substantially prevent fluid flow and an open configuration to allow fluid flow;
a fluid source fluidly connected to the input end of each of the plurality of cell stacks by a plurality of input lines, wherein the fluid source is configured to contain the first fluid;
a purge mechanism fluidly connected to the output end of each of the plurality of cell stacks by a plurality of output lines, wherein the purge mechanism is configured to receive the second fluid;
wherein the cell stack system is configured to deliver the first fluid from the fluid source to the input end of a first cell stack of the plurality of cell stacks via a first input line of the plurality of input lines and to receive the second fluid from the output end of a second cell stack of the plurality of cell stacks via a first output line of the plurality of output lines.

2. The electrochemical cell stack system of claim 1, wherein the system is configured so that any of the plurality of cells stacks can be the first cell stack and any of the plurality of cells stacks can be the second cell stack.

3. The electrochemical cell stack system of claim 2, wherein only one of the plurality of first valves at a time is configured to be in the closed configuration.

4. The electrochemical cell stack system of claim 3, wherein the first valve in the closed configuration is located between the first cell stack and the second cell stack.

5. The electrochemical cell stack system of claim 1, further comprising an inlet valve located between the fluid source and the plurality of input lines and configured to direct the first fluid from the first fluid source, through the first input line, to the first cell stack.

6. The electrochemical cell stack system of claim 1, further comprising an outlet valve located between the plurality of output lines and the purge mechanism and configured to direct the second fluid from the second cell stack, through the first output line, and to the purge mechanism.

7. The electrochemical cell stack system of claim 1, wherein the system is configured to periodically change which of the plurality of cell stacks is the first cell stack and which of the plurality of cell stacks is the second cell stack.

8. The electrochemical cell stack system of claim 7, further comprising a controller, wherein the controller controls which of the plurality of cells stacks is the first cell stack and which of the plurality of cell stacks is the second cell stack and controls when the first cell stack is changed and when the second cell stack is changed.

9. The electrochemical cell stack system of claim 8, further comprising at least one measuring device configured to measure at least one parameter of the system, wherein the controller changes the first and the second cell stacks based on the at least one measured parameter.

10. The electrochemical cell stack system of claim 1, further comprising at least one measuring device configured to measure at least one parameter of the system.

11. The electrochemical cell stack system of claim 1, wherein the first fluid is different than the second fluid.

12. The electrochemical cell stack system of claim 1, wherein the first fluid contains a lower concentration of non-hydrogen gas than the second fluid.

13. An electrochemical cell system comprising:
a plurality of cell stacks fluidly connected to each other to form a loop,
wherein fluid flows between the plurality of cell stacks in the loop, and wherein the system is configured to substantially prevent the flow of fluid between any two of the cell stacks, and wherein the system is configured to switch which two cell stacks of the plurality of cell stacks that the flow of fluid is prevented from flowing between;
wherein the cell stacks between which fluid is substantially prevented from flowing at a given time include a first cell stack and a second cell stack, wherein the first cell stack is configured to receive a first fluid from a fluid source and is configured to discharge the first fluid consecutively to the next of the plurality of cell stacks in the loop, and wherein the second cell stack is the last cell stack in the loop to receive the first fluid, and wherein the second cell stack is configured to discharge a second fluid to a purge valve; and
wherein the electrochemical cell stack system further comprises an outlet valve fluidly connecting the purge valve to a plurality of outlet lines, wherein the outlet valve is fluidly connected to each of the plurality of cell stacks via one of the plurality of outlet lines, and is configured to receive the second fluid from the second cell stack via one of the plurality of outlet lines at a time to deliver the second fluid to the purge valve.

14. The electrochemical cell stack system of claim 13, wherein the second fluid includes a higher concentration of contaminants than the first fluid.

15. The electrochemical cell stack system of claim 13, further comprising an inlet valve fluidly connecting the fluid source to a plurality of inlet lines, wherein the inlet valve is fluidly connected to each of the plurality of cell stacks via one of the plurality of inlet lines, and is configured to receive the first fluid from the fluid source and deliver the first fluid to the first cell stack via one of the plurality of inlet lines at a time.

16. The electrochemical cell stack system of claim 13, further comprising a controller operatively connected to the inlet valve and the outlet valve and configured to switch which cell stacks of the plurality of cell stacks that the flow of fluid is prevented from flowing between.

17. The electrochemical cell stack system of claim 16, further comprising at least one measuring device configured to measure at least one parameter of the system, wherein the controller switches which cell stacks of the plurality of cell stacks that the flow of fluid is prevented from flowing between based on the at least one measured parameter.

18. The electrochemical cell stack system of claim 17, wherein the at least one parameter includes voltage.

19. The electrochemical cell stack system of claim 18, wherein each of the cell stacks includes a plurality of individual cells, and wherein voltage is measured based on one of the plurality of individual cells in a cell stack, an average voltage of the individual cells in a cell stack, or a maximum voltage of the plurality of individual cells of a cell stack.

20. The electrochemical cell stack system of claim 13, wherein each of the plurality of cells stacks is fluidly connected to at least three other cell stacks.

21. The electrochemical cell stack system of claim 13, wherein the plurality of cell stacks includes at least one of a hydrogen compressor or a hydrogen purifier.

* * * * *